United States Patent
Mietke (10) Patent No.: US 11,086,839 B2
(45) Date of Patent: Aug. 10, 2021

(54) BIJECTIVE TRANSFORMATION FOR COMPRESSION OF GUID

(71) Applicant: SAP SE, Walldorf (DE)

(72) Inventor: Sebastian Mietke, Reilingen (DE)

(73) Assignee: SAP SE, Walldorf (DE)

(*) Notice: Subject to any disclaimer, the term of this patent is extended or adjusted under 35 U.S.C. 154(b) by 197 days.

(21) Appl. No.: 16/145,924

(22) Filed: Sep. 28, 2018

(65) Prior Publication Data

US 2020/0104389 A1    Apr. 2, 2020

(51) Int. Cl.
*G06F 16/22* (2019.01)
*G06F 1/035* (2006.01)
*G06F 16/21* (2019.01)

(52) U.S. Cl.
CPC .......... *G06F 16/2282* (2019.01); *G06F 1/035* (2013.01); *G06F 16/217* (2019.01)

(58) Field of Classification Search
None
See application file for complete search history.

(56) References Cited

U.S. PATENT DOCUMENTS

| | | | | |
|---|---|---|---|---|
| 10,698,825 | B1* | 6/2020 | Ramagiri | G06F 12/0822 |
| 2004/0215981 | A1* | 10/2004 | Ricciardi | G16H 50/30 |
| | | | | 726/27 |
| 2006/0129540 | A1* | 6/2006 | Hillis | G06F 16/24578 |
| 2007/0005632 | A1* | 1/2007 | Stefani | G06F 16/81 |
| 2008/0301197 | A1* | 12/2008 | Mills | G06F 16/27 |
| 2009/0154704 | A1* | 6/2009 | Farrugia | G06F 21/10 |
| | | | | 380/277 |
| 2016/0021064 | A1* | 1/2016 | Lock | H04L 63/0428 |
| | | | | 726/26 |
| 2018/0219964 | A1* | 8/2018 | Carpenter | H03M 7/30 |
| 2018/0288049 | A1* | 10/2018 | Donlan | H04L 63/10 |

* cited by examiner

*Primary Examiner* — Kris E Mackes
*Assistant Examiner* — Soheila (Gina) Davanlou
(74) *Attorney, Agent, or Firm* — Buckley, Maschoff & Talwalkar LLC

(57) ABSTRACT

Provided is a method and system for transforming a GUID of a database entry into a reduced identifier. The transformation may be performed by a bijective function. In one example, the method may include one or more of receiving a database entry which includes a global unique identifier (GUID) which uniquely identifies the database entry, identifying a transformation function associated with the database entry, transforming the GUID into a reduced identifier based on the transformation function wherein the reduced identifier has a reduced size with respect to a size of the GUID, and storing the database entry based on the reduced identifier.

21 Claims, 7 Drawing Sheets

FIG. 3A
(Normalization)

300A

| Timestamp t(s) | GUID (312) |
|---|---|
| 22.03.2018 – 10:24:51 | FA163ED168331EE88BB66709A34CE298 |
| 22.03.2018 – 10:26:33 | FA163ED168331EE88BB668AB7B019B8C |
| 22.03.2018 – 10:27:16 | FA163ED168331EE88BB66A66CEE2DB8F |
| 22.03.2018 – 10:27:49 | FA163ED168331EE88BB66B992F51BB8F |
| 22.03.2018 – 10:29:28 | FA163ED168331EE88BB66CD433CA5B8F |

302

| Timestamp t(s) | GUID (Normalized) (322) |
|---|---|
| 22.03.2018 – 10:24:51 | FA163ED168331EE88BB66709A34CE298 |
| 22.03.2018 – 10:26:33 | FA163ED168331EE88BB66709A34CE299 |
| 22.03.2018 – 10:27:16 | FA163ED168331EE88BB66709A34CE300 |
| 22.03.2018 – 10:27:49 | FA163ED168331EE88BB66709A34CE301 |
| 22.03.2018 – 10:29:28 | FA163ED168331EE88BB66709A34CE302 |

302

FIG. 3B
(Transformation)

| Timestamp t(s) ⌐302 | GUID (Normalized) ⌐322 | Reduced ID ⌐332 |
|---|---|---|
| 22.03.2018 – 10:24:51 | FA163ED168331EE88BB66709A34CE298 | 000100298 |
| 22.03.2018 – 10:26:33 | FA163ED168331EE88BB66709A34CE299 | 000100299 |
| 22.03.2018 – 10:27:16 | FA163ED168331EE88BB66709A34CE300 | 000100300 |
| 22.03.2018 – 10:27:49 | FA163ED168331EE88BB66709A34CE301 | 000100301 |
| 22.03.2018 – 10:29:28 | FA163ED168331EE88BB66709A34CE302 | 000100302 |

Bijective Transformation Function

Reduced ID = F(GUID) = (GUID − FA163ED168331EE88BB66709A33CE000) ⌐340

GUID = F$^{-1}$(Reduced ID) = (Reduced ID + FA163ED168331EE88BB66709A33CE000) ⌐342

FIG. 4

| Purpose | GUID | Reduced ID |
|---|---|---|
| A | EEB33AB2225544B66CCC1245EFDA22AB | 0001247 000100298 |
| A | EEB33AB2225544B66CCC1245EFDA22AC | 0001247 000100299 |
| B | FA163ED168331ED88AEB0EA37EF43303 | 0035942 000100299 |
| B | FA163ED168331ED88AEB0EA37EF43304 | 0035942 000100300 |
| B | FA163ED168331ED88AEB0EA37EF43305 | 0035942 000100301 |

400
401 GUID
402 Reduced ID
404
411
412

FIG. 6

BIJECTIVE TRANSFORMATION FOR COMPRESSION OF GUID

BACKGROUND

Globally unique identifiers (GUIDs) are used by database systems to uniquely identify records. GUIDs may also be referred to as universally unique identifiers (UUIDs). A typical GUID is a number that is 32 digits which may be represented as a 32-byte character or a 16-byte hexadecimal value (e.g., 126 to 256 bits) in order to be globally unique. In other words, GUID numbers are intentionally very large so that it is improbable to create duplicates. Large-scale database systems can store billions of data records and each data record may be assigned a GUID. As will be appreciated, 32 bytes of information multiplied by billions of database entries (for example) is a significant amount of information. Occupation of storage is of particular interest for in-memory databases where database tables are commonly stored in random-access memory (RAM), which is significantly faster and more expensive in comparison to hard disk drives (HDD) or solid state drives (SSD).

Traditional database compression involves the use of dictionary compression which replaces an actual data value with a key value having a smaller size. For dictionary compression to work, a relationship or mapping between the actual data value and its respective key value must be maintained within a dictionary table. Dictionary compression can be beneficial when a large data value is used in many places within a database such that the cost of storing the mapping information is negligent. However, each GUID may only be stored a few times in the database. Therefore, dictionary compression can lead to even more memory consumption than with the GUID alone because in addition to replacing each GUID with a key value, a mapping between the original GUID and the key value needs to be stored. Accordingly, what is needed is a new compression mechanism for reducing the size of GUIDs within a database that does not rely on dictionary compression.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

The example embodiments overcome the drawbacks in the prior art by transforming a global identifier (GUID) into a reduced identifier which is local to the database using a bijective transformation function. The resulting reduced identifier is smaller in size but still unique to the system thereby reducing the amount of storage occupied by GUIDs. Accordingly, the reduced identifier can replace the GUID and can be used to uniquely identify a database item within the database system. Furthermore, an inverse of the bijective function that is used to transform the GUID into the reduced identifier can be used to regenerate the GUID based on the reduced identifier, if necessary.

Accordingly, a database no longer needs to store a mapping between each GUID and its key value. Instead, the system only needs to store the bijective function which is used to transform the GUIDs. The only additional space required is enough space in memory to store the function itself which may be a few bytes rather than an entire dictionary table mapping GUIDs to key values which can consume significant amounts of memory. As a result, storage space previously occupied by GUIDs can be preserved and used for storing additional data. Through the newly provided reduced identifier, GUIDs can be replaced/removed from the system. Here, the GUIDs are removed not only on the database table but also from dictionary tables. Rather, the only remaining identifier is the reduced identifier. If necessary, the reduced identifier can be used to recalculate the GUID based on an inverse transform function, but this situation will be rare.

GUIDs are typically between 16-32 bytes (128 to 256 bits) depending on the data type. However, much of the data within a GUID is not needed and is generated based on the mechanism used to create the GUID which can vary. Examples of GUID creation methods include random numbers, timestamp-based, content-based, and the like. The example embodiments use a bijective transformation function to reduce the GUID from a numerical value of 16 or 32 bytes to a numerical value having 3-4 bytes. Furthermore, instead of keeping a mapping, the database only has to store the bijective transformation function that is used to convert the GUID to a reduced unique identifier.

In some embodiments, before the transformation, a numerical value of a GUID may be normalized to reduce a numerical gap between a numerical value of a previous GUID generated by the system. The normalized GUID may be converted using a function that essentially removes or subtracts a number of digits from the GUID while retaining enough unique digits such that a unique reduced identifier is possible within the database system. The normalization process can tightly pack numerical values together in sequence (e.g., incremental, etc.) By tightly packing the numerical values, the amount of GUIDS that can be converted using the function may be increased.

Figure 1:
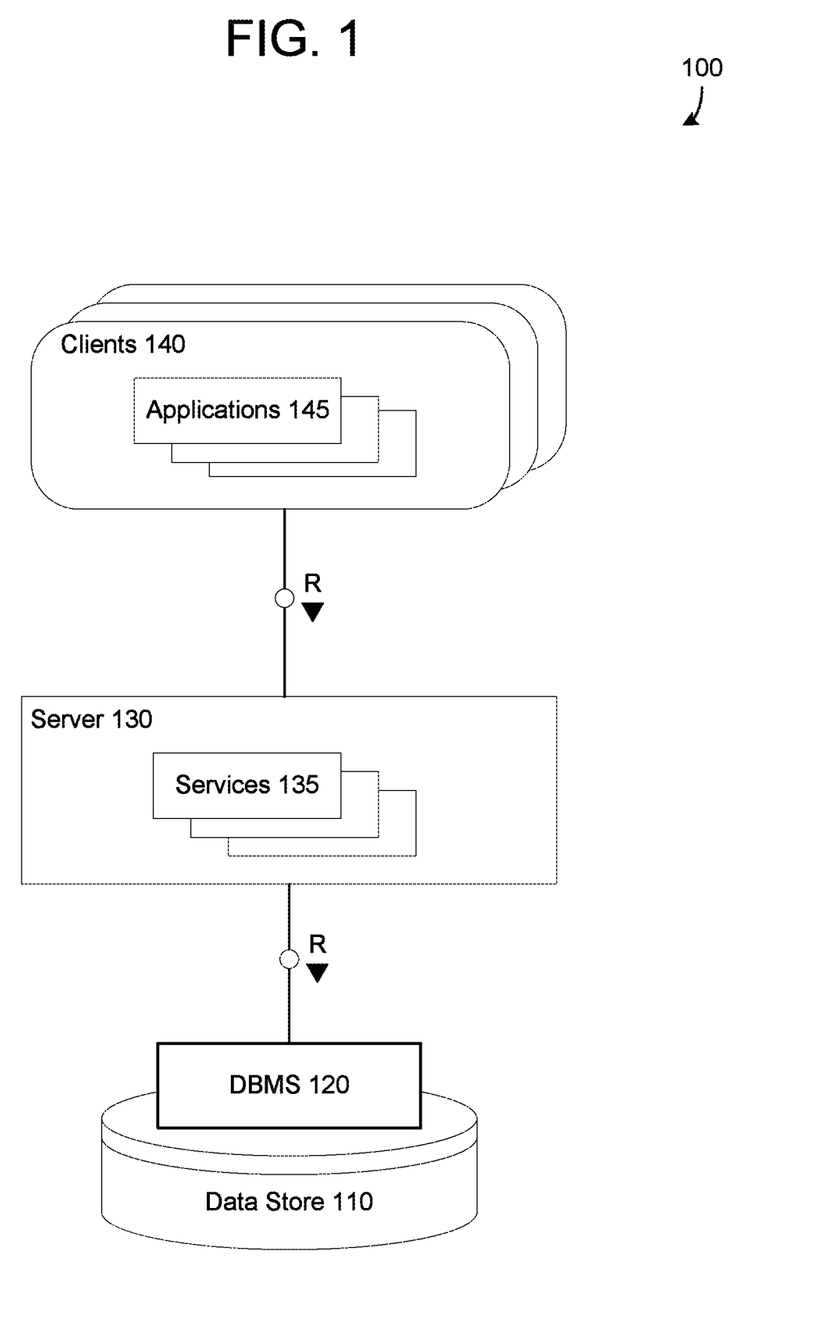
FIG. 1 is a diagram illustrating a database system architecture in accordance with an example embodiment.

FIG. 1 illustrates a system architecture of a database 100 in accordance with an example embodiment. It should be appreciated that the embodiments are not limited to architecture 100 or to a database architecture, however, FIG. 1 is shown for purposes of example. Referring to FIG. 1, the architecture 100 includes a data store 110, a database management system (DBMS) 120, a server 130, services 135, clients 140 and applications 145. Generally, services 135 executing within server 130 receive requests from applications 145 executing on clients 140 and provides results to applications 145 based on data stored within data store 110. For example, server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145 (e.g., drag-and-drop operations), retrieving data from data store 110 based on the requests, processing the data received from data store 110, and providing the processed data to applications 145.

In one non-limiting example, a client 140 may execute an application 145 to perform visual analysis of analytical data output to a user interface on a display of the client 140 which allows the user to view analytical information such as charts, graphs, tables, and the like, based on the underlying data stored in the data store 110. The application 145 may pass analytic information based on the input to one of services 135. A structured query language (SQL) script may be generated based on the request and forwarded to DBMS 120. DBMS 120 may execute the SQL script to return a result set based on data of data store 110, and the application 145 creates a report/visualization based on the result set. As another example, the analytic data may be input by the user and provided directly from the application 145 to the DBMS 120 or the data store 110. According to various embodiments, an application 145 may include the logical components to perform the data merge and conflict resolution steps/processes described herein.

The services 135 executing on server 130 may communicate with DBMS 120 using database management interfaces such as, but not limited to, Open Database Connectivity (ODBC) and Java Database Connectivity (JDBC) interfaces. These types of services 135 may use SQL to manage and query data stored in data store 110. The DBMS 125 serves requests to query, retrieve, create, modify (update), and/or delete data from database files stored in data store 110, and also performs administrative and management functions. Such functions may include snapshot and backup management, indexing, optimization, garbage collection, and/or any other database functions that are or become known.

Server 130 may be separated from or closely integrated with DBMS 120. A closely-integrated server 130 may enable execution of services 135 completely on the database platform, without the need for an additional server. For example, server 130 may provide a comprehensive set of embedded services which provide end-to-end support for Web-based applications. The services 135 may include a lightweight web server, configurable support for Open Data Protocol, server-side JavaScript execution and access to SQL and SQLScript. Server 130 may provide application services (e.g., via functional libraries) using services 135 that manage and query the database files stored in the data store 110. The application services can be used to expose the database data model, with its tables, views and database procedures, to clients 140. In addition to exposing the data model, server 130 may host system services such as a search service, and the like.

Data store 110 may be any query-responsive data source or sources that are or become known, including but not limited to a SQL relational database management system. Data store 110 may include or otherwise be associated with a relational database, a multi-dimensional database, an Extensible Markup Language (XML) document, or any other data storage system that stores structured and/or unstructured data. The data of data store 110 may be distributed among several relational databases, dimensional databases, and/or other data sources. Embodiments are not limited to any number or types of data sources. In some embodiments, the data of data store 110 may include files having one or more of conventional tabular data, row-based data, column-based data, object-based data, and the like. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another. Furthermore, data store 110 may support multiple users that are associated with the same client and that share access to common database files stored in the data store 110.

According to various embodiments, data items (e.g., data records, data entries, etc.) may be stored, modified, deleted, and the like, within the data store 110. As an example, data items may be created, modified, or deleted based on instructions from any of the applications 145, the services 135, and the like. Each data item may be assigned a globally unique identifier (GUID) by an operating system, or other program of the database 100. The GUID is used to uniquely identify that data item from among all other data items stored within the database 100. GUIDs may be created in multiple ways including, but not limited to, random, time-based, hardware-based, content-based, a combination thereof, and the like. Examples of conventions for creating GUIDs are described in RFC 4122. For example, in the random number GUID creation, a random-number generator may be used to create a GUID (e.g., a 128-bit number, etc.) As another example, a time-based GUID may be created based on a current time detected from a system clock. Hardware-based GUIDs may be generated based on a MAC address of a network card, etc. As another example, content-based GUIDs may be created based on a hash of the file contents.

The architecture 100 may include metadata defining objects which are mapped to logical entities of data store 110. The metadata may be stored in data store 110 and/or a separate repository (not shown). The metadata may include information regarding dimension names (e.g., country, year, product, etc.), dimension hierarchies (e.g., country, state, city, etc.), measure names (e.g., profit, units, sales, etc.) and any other suitable metadata. According to some embodiments, the metadata includes information associating users, queries, query patterns and visualizations. The information may be collected during operation of system and may be used to determine a visualization to present in response to a received query, and based on the query and the user from whom the query was received.

Each of clients 140 may include one or more devices executing program code of an application 145 for presenting user interfaces to allow interaction with application server 130. The user interfaces of applications 145 may comprise user interfaces suited for reporting, data analysis, and/or any other functions based on the data of data store 110. Presentation of a user interface may include any degree or type of rendering, depending on the type of user interface code generated by server 130. For example, a client 140 may execute a Web Browser to request and receive a Web page (e.g., in HTML format) from application server 130 via HTTP, HTTPS, and/or Web Socket, and may render and present the Web page according to known protocols.

One or more of clients 140 may also or alternatively present user interfaces by executing a standalone executable file (e.g., an .exe file) or code (e.g., a JAVA applet) within a virtual machine. Clients 140 may execute applications 145 which perform merge operations of underlying data files stored in data store 120. Furthermore, clients 140 may execute the conflict resolution methods and processes described herein to resolve data conflicts between different versions of a data file stored in the data store 110. A user interface may be used to display underlying data records, and the like.

Figure 2:
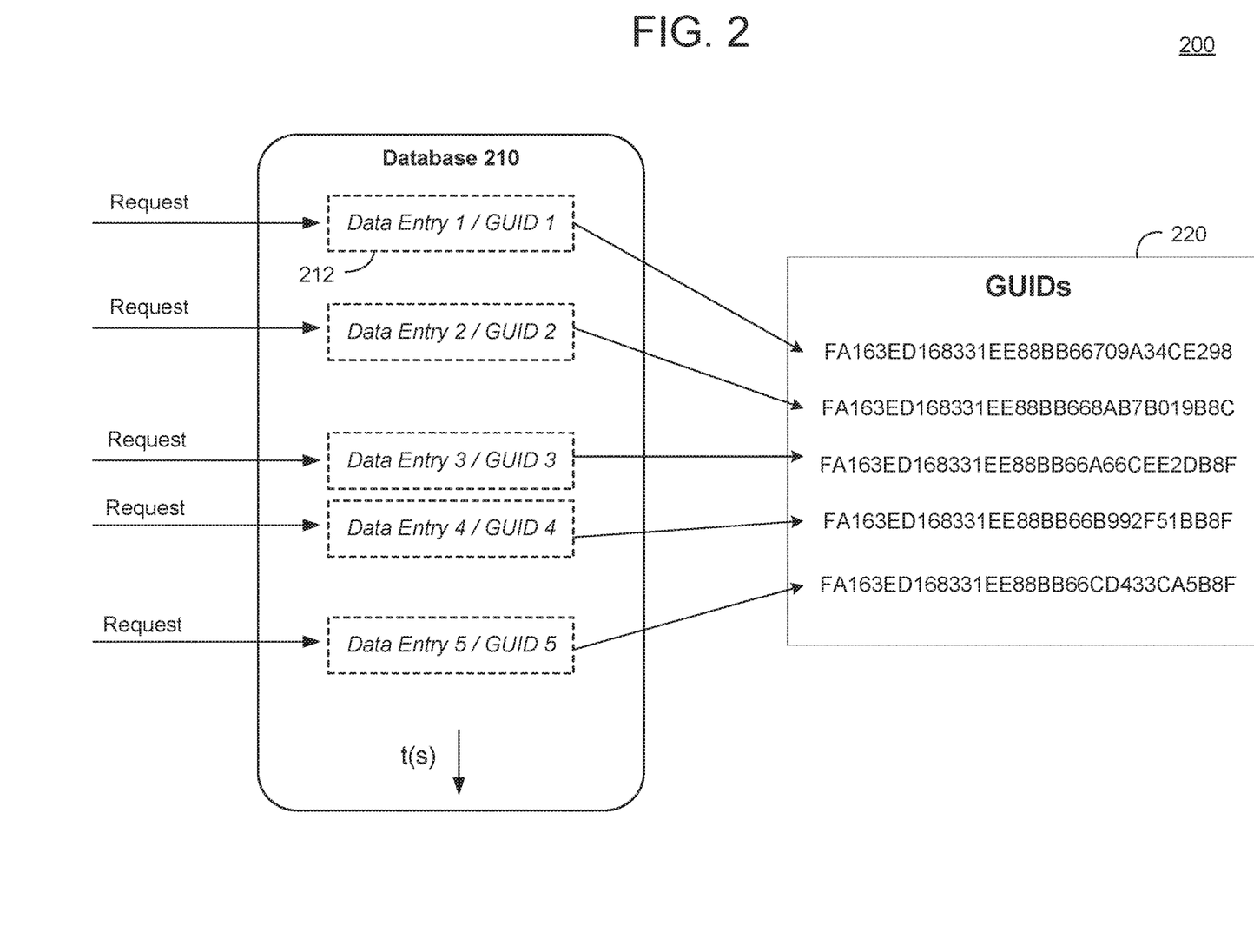
FIG. 2 is a diagram illustrating a process of GUIDs being generated in accordance with an example embodiment.

FIG. 2 illustrates a process 200 of GUIDs being generated by a database 210 in accordance with an example embodiment. Referring to FIG. 2, as database items 212 are created by the database 210, the database 210 (e.g., an operating system, a program, etc.) assigns GUIDs to the database items 212 which uniquely identify each database item 212 with respect to each other. Here, the database items 212 can include storage records that are generated when data is inserted, deleted, modified, etc. The database entries may be stored in database tables. In the example of FIG. 2, the process 200 generates five database entries 212 over time causing the database 210 to generate five GUIDs 220 which may be stored in a table along with other data of the database entries 212 (which is not shown in this example).

The use of GUIDs has several advantages including that GUIDs are unique across every table, every database, every server, on a global basis. While it cannot be completely ensured that a GUID is not going to be duplicated, the chances are so unlikely that it is considered negligible. GUIDs allow for easy merging of records from different database systems that rely on GUIDs as unique identifiers. Furthermore, GUIDs allow for easy distribution of databases across multiple servers. The database can generate GUIDs anywhere, instead of having to roundtrip to the database. Furthermore, most replication scenarios require GUID columns anyway.

However, some of the drawbacks of GUIDs include that GUIDs are 4 times larger than a traditional 4-byte index value. This can cause serious performance and storage issues if not used carefully. GUIDs are cumbers some to debug, hard to manipulate, can cause the index to bloat, can require fragmentation, and can increase the cost of table maintenance. The generated GUIDs should be partially sequential for best performance and to enable use of clustered indexes. This can create further issues.

Figure 3A:
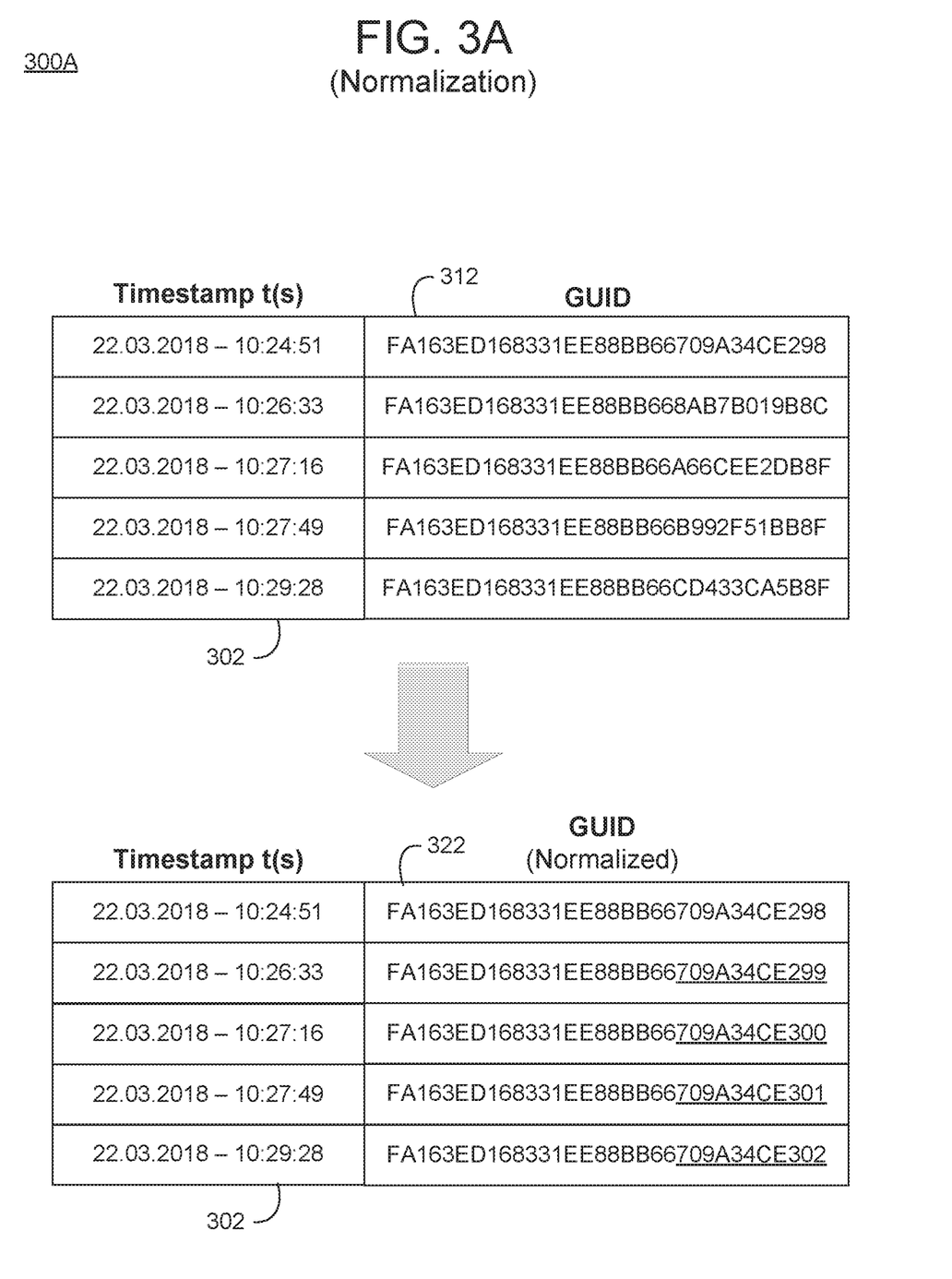
FIGS. 3A-3B are diagrams illustrating a process of transforming a GUID into a reduced identifier in accordance with example embodiment.
Figure 3B:
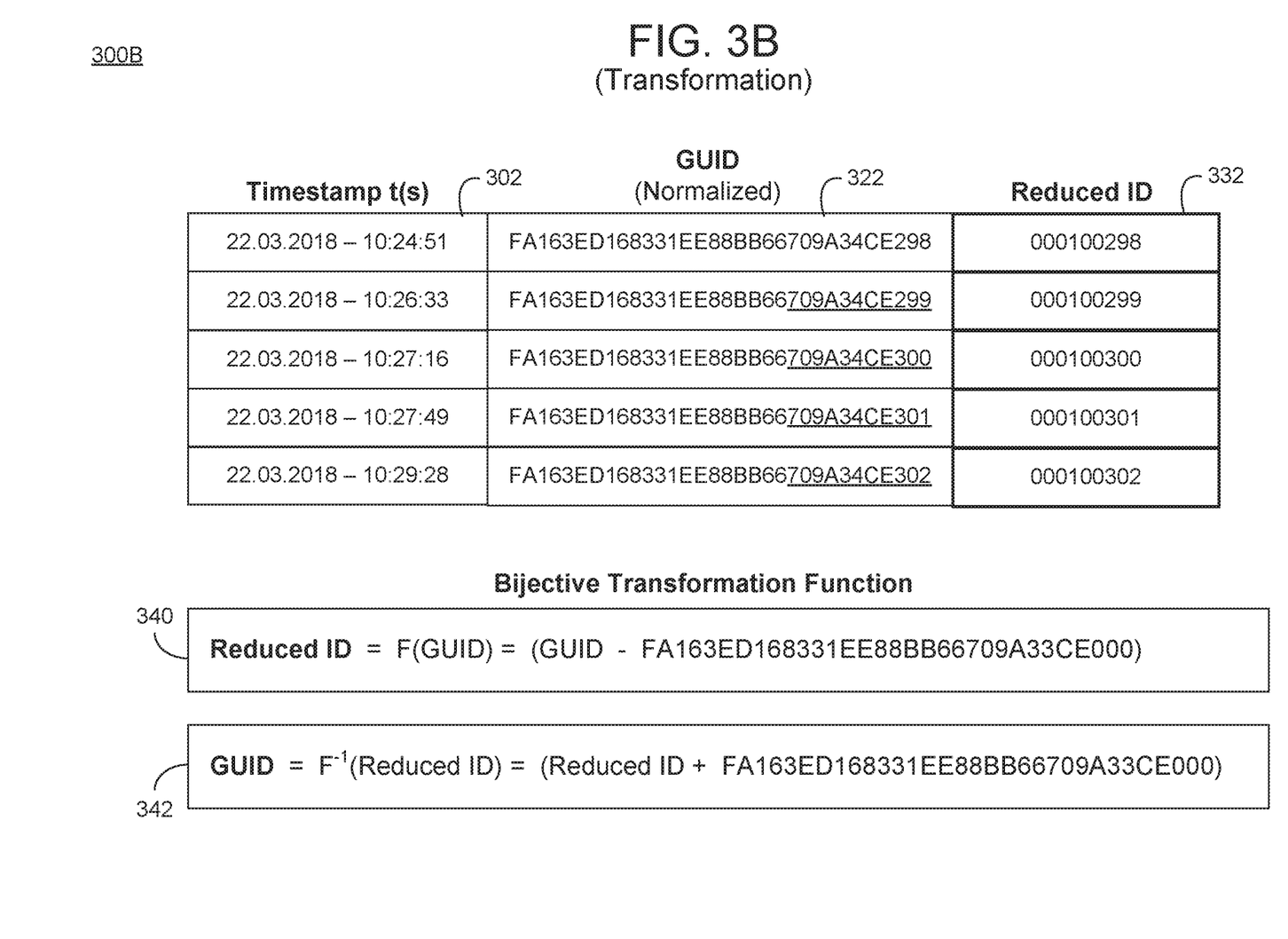

FIGS. 3A-3B illustrate a process of transforming a GUID into a reduced identifier in accordance with example embodiment. The end-to-end process may include a normalization process in 300A of FIG. 3A, and a transformation process in 300B of FIG. 3B. In some embodiments, the normalization process is not performed. As another example, the normalization process may not be needed because a database may automatically generate normalized GUIDs. However, for convenience of explanation the normalization process 300A is described herein.

Related database compression techniques use shared dictionary tables in which a data item is replaced with a smaller key value and a mapping between the data item in the key value is stored in a dictionary. Unfortunately, this approach is not feasible for GUIDs. The example embodiments provide another approach. The idea is based on the premise that the actual value of the GUID is not relevant (in most cases). For all database operations, the database just needs to ensure that the identifier is unique in the current scope. Accordingly, the amount of information per identifier may be reduced. A single or even many related database tables may be reduced in size in comparison to every existing database in sum.

According to various embodiments, a bijective function f can be used to transform a GUID into a locally unique identifier (referred to herein as a reduced identifier). The inverse function $f^1$ may be used to transform the reduced identifier back to its original value (i.e., the original GUID). Contrary to the internal dictionary compression technique or the shared dictionary approach, the original GUID is not stored any longer but is replaced by the reduced identifier. In other words, the original GUID is not needed in the database nor in a dictionary table. Rather, only the identifiers and the function f (e.g., an identifier of the function) needs to be stored. Since the function is fixed, the original GUID could be retrieved at any time.

In general, GUIDs are generated by a simple algorithm, for example, based on system attributes, application/software components, timestamps, randomly, or the like. Thus, a GUID range could be estimated for a certain purpose. GUIDs that are provided for a certain purpose and are usually generated one by one (and are commonly sorted ascending). In some cases, the generation algorithm already represents the inverse function.

Referring to FIG. 3A, a plurality of GUIDs 312 are created and correspond to a plurality of timestamps 302, respectively. Initially, the GUIDs are sorted ascending, corresponding to the timestamp. However, as is shown in FIG. 3A, the GUIDs 312 are sorted ascending, but they are not directly following each other. In other words, significant numerical gaps exist between the GUIDs. This could be caused by any number of factors. For example, the GUID may be randomly generated and therefore the gaps are essential. As another example, the GUIDs may be based on timestamps, content, etc., and therefore the gaps are inherent. In the process 300A the GUIDs 312 are normalized into normalized GUIDs 322. In this case, the normalization won't affect the uniqueness of the GUID. It just ensures, that the reduced identifier could be derived more easily.

The normalization function considers only the actual GUIDs, which are present in the system. The normalization ensures, that the GUIDs are directly following each other and are tightly packed together thereby reducing numerical gaps. For existing systems, the normalization process might be performed by a central service. The source code as well as the data flow might be analysed here, to identify columns which belong together. (These columns should be normalized the same way.) As an example, JOIN conditions might be analysed here. In some cases, an executable program might encapsulate the inverse function which may be used to retrieve the GUID for a given reduced ID.

Next, as shown in FIG. 3B, the normalized GUIDs 322 are transformed into reduced identifiers 332 using a bijective transformation function 340 which receives the normalized GUID as an input. In this example, the bijective transformation function 340 includes an offset (FA163ED168331EE88BB66709A33CE000) which is subtracted from each GUID to generate the reduced identifier. Also, the system may truncate the remaining digits of the reduced identifier, for example, such that only 10 digits (3 bytes) are used instead of 128 or 256 bits (e.g., 16-byte hexadecimal value, etc.). Here, the reduced identifiers 332 may be used to uniquely identify the respective database entries corresponding thereto within the database system, rather than the GUIDs 312. As a result, instead of storing a 16 byte hexadecimal value GUID, a 3 byte value or a 4 byte value reduced identifier can be stored.

Furthermore, instead of storing a mapping table between the GUIDs 312 and the respective reduced identifiers 332, the bijective transformation function 340 may be stored once and identified by the database and used to regenerate or otherwise recover any GUID. In this example, an inverse function 342 of the bijective transformation function 340 may be used to recover any GUID that has been transformed into a reduced identifier. Here, the inverse function 342 may receive the reduced identifier as an input and recreate the normalized GUID. In addition to saving storage space by replacing each GUID with a reduced identifier within the database entries, a dictionary table (for mapping GUIDs to keys) can be removed from the database. Therefore, the storage savings are significant (e.g., 50% or more) than in comparison to the dictionary compression technique.

Figure 4:
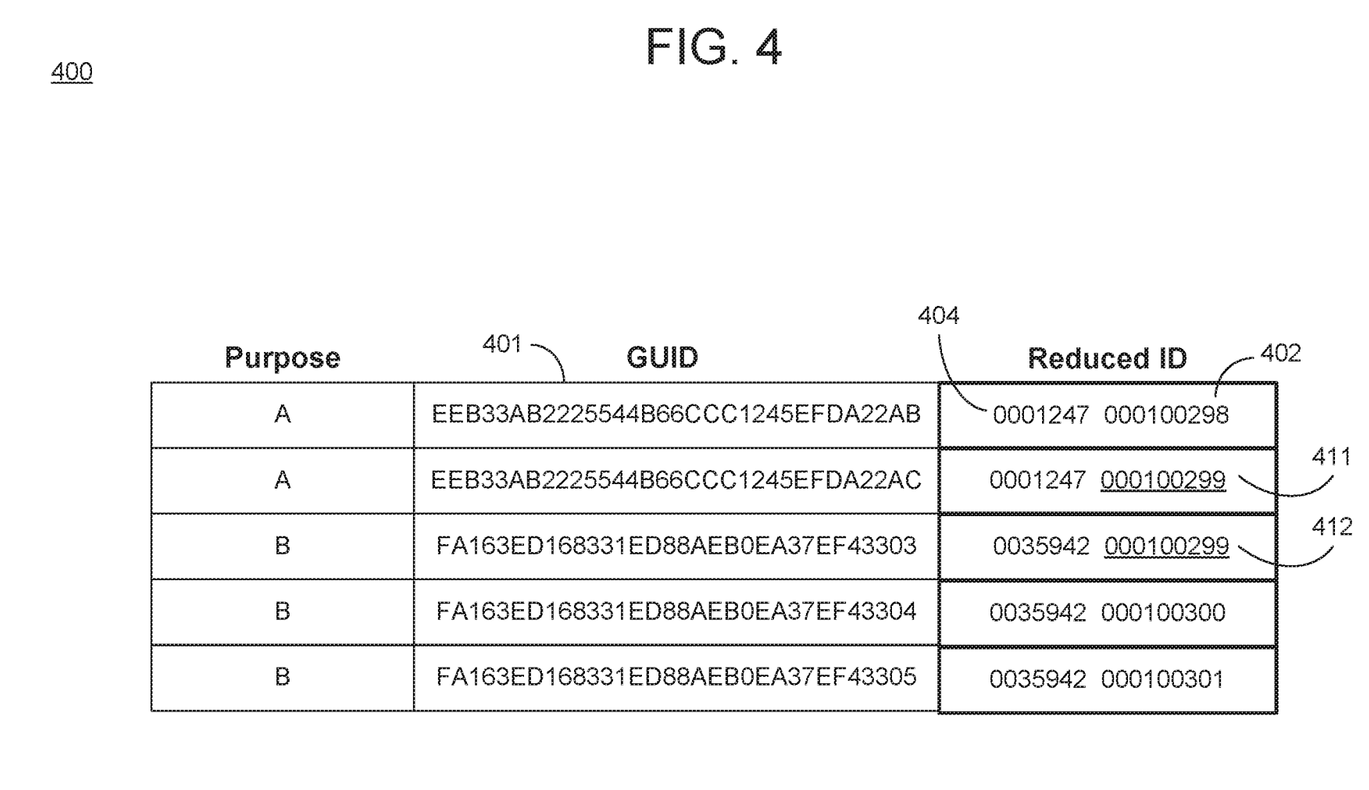
FIG. 4 is a diagram illustrating a process of adding a prefix to a reduced identifier based on purpose in accordance with an example embodiment.

FIG. 4 illustrates a process 400 of adding a prefix to a reduced identifier based on purpose in accordance with an example embodiment. Referring to FIG. 4, data entries may be associated with different purposes. For example, a purpose may be related to an application, a tenant/client, a table, a column, or the like, of the database. In the example of FIG. 4, GUIDs 401 are generated for two different purposes A and B. The reduced four-byte identifier 402 is represented by a ten-digit integer. Overlapping intervals produce duplicate entries such as shown in reduced identifiers 411 and 412. To maintain uniqueness, the system herein can assign a prefix 404 to each reduced identifier and concatenate the prefix 404 to the ten-digit identifier 402 to generate the final reduced identifier. For example, the prefix may be assigned based on the purpose from among different prefixes associated with different purposes. The prefix only increases the reduced the length of the reduced identifier by 7 bits (2-3 bytes) in this example. Therefore, the overall length is increased to seven bytes, which is still quite less than 16/32 bytes.

In this example, the purpose A is assigned a prefix of "0001247" while the purpose B is assigned a prefix of "0035942." If the actual GUID is needed, the original value may be recalculated again. Here a simple executable program or a subroutine might be used that stores the prefixes. Anyway, it is assumed that this is only required for very specific/rare use cases. As already mentioned, the purpose of a GUID is just for identification. In some cases, a central repository is consumed, containing the function identifiers and the functions themselves. If a new purpose or a new GUID range with a new function is required, the repository may be updated. In one of the easiest examples, the functions could just consist of a zero-degree polynomial, which results in just an offset. This happens automatically, if the GUID column is normalized. Here it is sufficient just to store the function identifier and a starting value for the GUID range. Because the length of the reduced identifier is significantly shorter than the original GUID, adjustments of the consuming source code might be required (e.g., changes or data declarations in development objects). These adjustments could be derived and performed automatically by an executable program.

According to various embodiments, ranges of GUIDs may be replaced with reduced identifiers that are locally unique. The reduced identifiers may be generated based on a bijective transformation function that enables the GUID to be recovered if needed. In some cases, different GUID ranges may be replaced with different ranges of reduced identifiers and different bijective transformation functions. In some embodiments, the data may be associated with a single purpose or it may be associated with multiple purposes. In a case of multiple purposes, the reduced identifier can include a prefix which is concatenated to the initially determined value to further distinguish the reduced identifier based on purpose.

Figure 5:
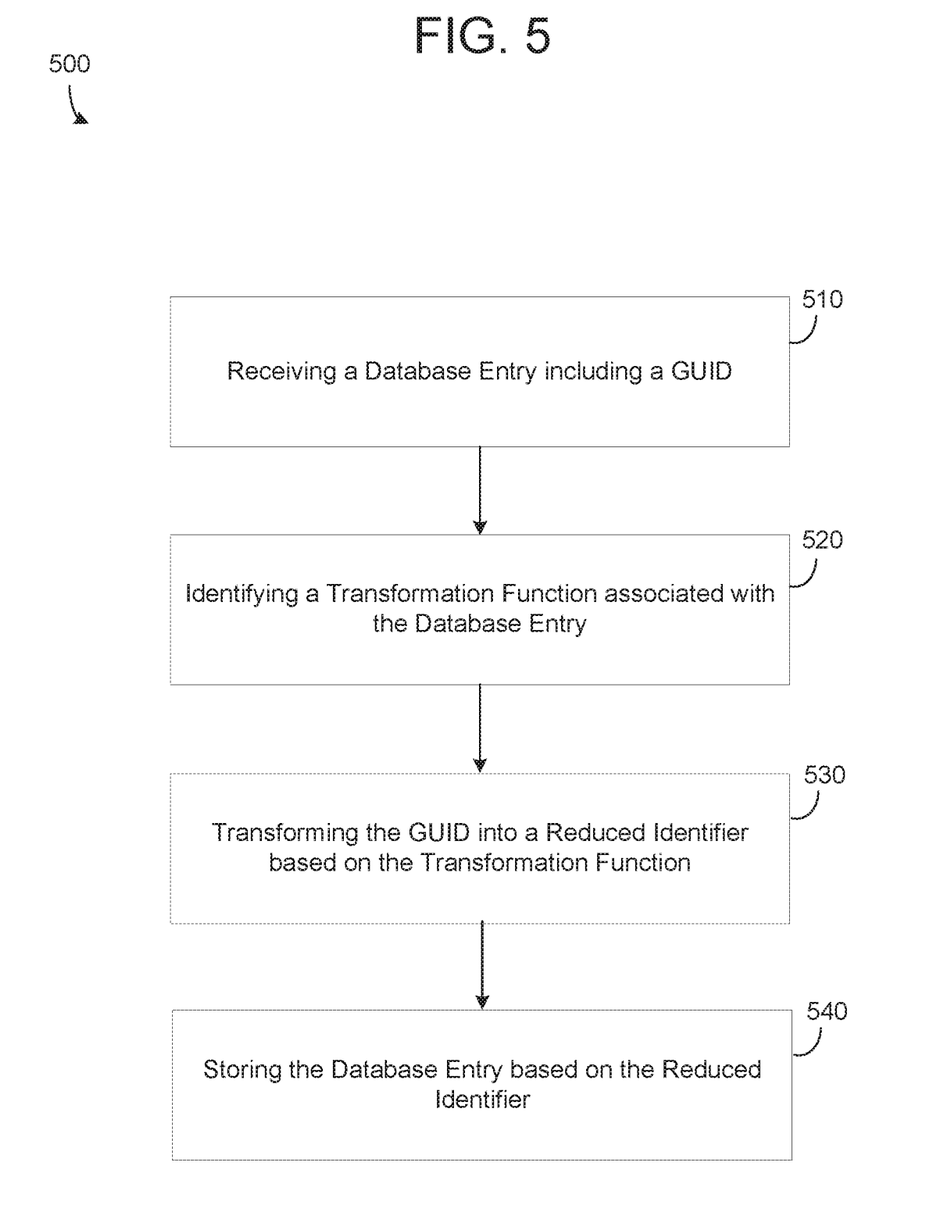
FIG. 5 is a diagram illustrating a method of transforming a GUID into a reduced identifier in accordance with an example embodiment.

FIG. 5 illustrates a method 500 of transforming a GUID into a reduced identifier in accordance with an example embodiment. For example, the method 500 may be performed by a database node, a cloud platform, a server, a computing system (user device), or the like. Referring to FIG. 5, in 510, the method may include receiving a database entry which includes a global unique identifier (GUID) which uniquely identifies the database entry. The GUID may be created by an operating system or other program. The GUID may be created randomly and/or based on other factors such as a timestamp, a content of the database entry, or the like.

In 520, the method may include identifying a transformation function associated with the database entry. The transformation function may be a bijective transformation function that is stored within the database. For example, the bijective transformation function may convert the GUID into a reduced identifier while an inverse of the bijective transfer function may be configured to regenerate the GUID from the reduced identifier. As one non-limiting example, the bijective transfer function may include an offset which is subtracted the GUID to create a smaller numerical value. The offset may be large enough such that most of the values of the GUID become null or zero thereby leaving only a few bit values (e.g., 10, etc.).

In 530, the method may include transforming the GUID into a reduced identifier based on the transformation function, wherein the reduced identifier comprises a reduced size with respect to a size of the GUID, and in 540, storing the database entry based on the reduced identifier. In some embodiments, the method may further include normalizing the GUID prior to the transforming to generate a normalized GUID with respect to previous GUIDs among a sequence of GUIDs created by the database. Here, the normalization may reduce a numerical gap between GUID values. This can make the transformation function easier to perform. In some embodiments, the GUID may be automatically normalized to begin with. In other words, the database may initially generate a GUID that has a normalized value.

In some embodiments, the method may further include determining the reduced identifier based on an increment of a previously assigned reduced identifier In some embodiments, the identifying of the transformation function may also include identifying a purpose associated with the database entry from among a plurality of purposes, and concatenating a prefix to the reduced identifier based on the identified purpose. In this example, the plurality of purposes may correspond to a plurality of respective columns of data within a database table. The prefix may add an additional few bits to the reduced identifier but may prevent duplicate reduced identifiers.

Figure 6:
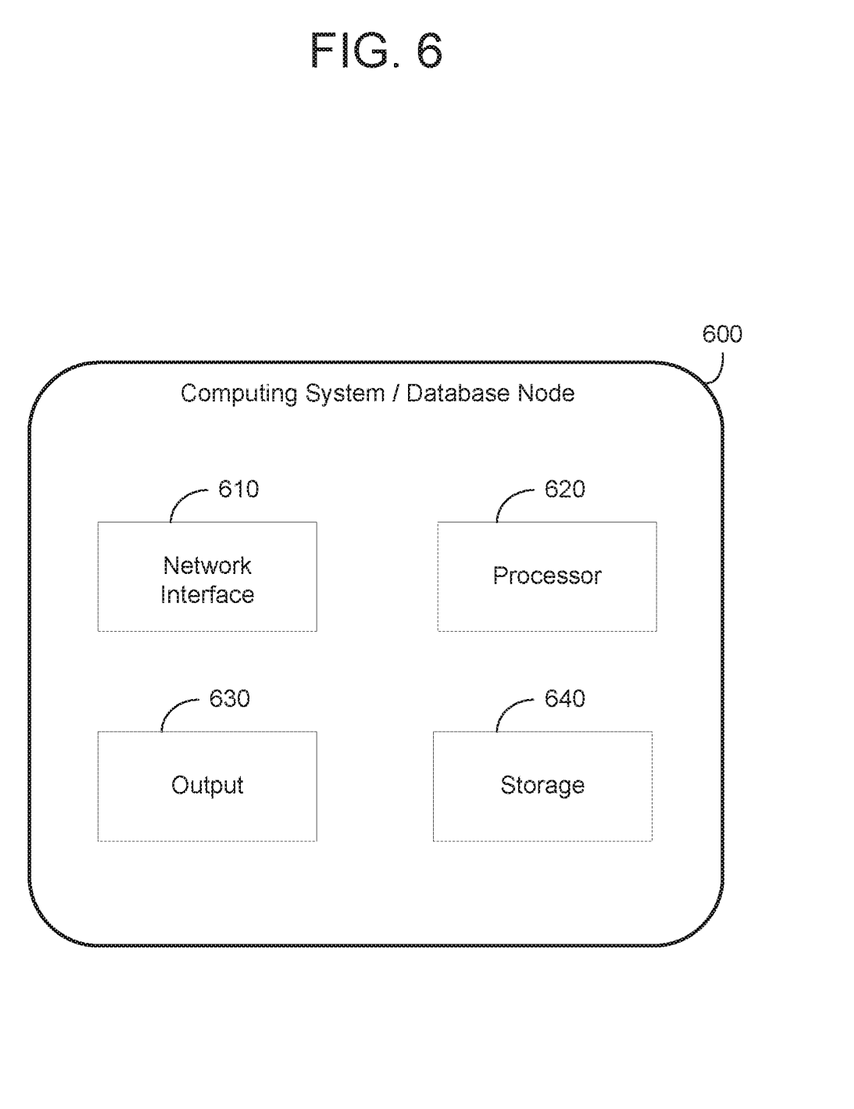
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple devices. Referring to FIG. 6, the computing system 600 includes a network interface 610, a processor 620, an output 630, and a storage device 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The output 630 may output data to an embedded display of the computing system 600, an externally connected display, a display connected to the cloud, another device, and the like. For example, the output 630 may include a port, an interface, a cable, a wire, a board, and/or the like, with input/output capabilities. The network interface 610, the output 630, or a combination thereof, may interact with applications executing on other devices.

The storage device 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 5. According to various embodiments, the storage 640 may include a data store having a plurality of tables, partitions and sub-partitions. The storage 640 may be used to store database records, items, entries, and the like.

According to various embodiments, the processor 620 may receive a database entry that includes a global unique identifier (GUID) which uniquely identifies the database entry. In response, the processor 620 may identify a transformation function associated with the database entry which is stored in the database, and transform the GUID into a reduced identifier based on the transformation function. Here, the reduced identifier may have a reduced size with respect to a size of the GUID. For example, the reduced identifier may be 3 bytes while the GUID may be 16 bytes, 32 bytes, etc. Furthermore, the processor 620 may replace the GUID with the reduced identifier in the database and store the database entry within the storage 640 such that the database entry is identified using the reduced identifier. Here, the reduced identifier may include a local identifier that is unique within the database system.

In some embodiments, the processor 620 may normalize the GUID prior to the transforming the GUID into the reduced identifier to generate a normalized GUID with respect to previous GUIDs among a sequence of GUIDs created by the database. In some embodiments, the transformation function may include an offset which the processor 620 subtracts from the GUID to generate the reduced identifier. In some embodiments, the transformation function may include a bijective transformation function in which an inverse thereof is configured to regenerate the GUID from the reduced identifier.

In some embodiments, the GUID of the database entry may be created based on a timestamp at which the database entry is created by the database. In some embodiments, the processor 620 may identify a purpose associated with the database entry from among a plurality of purposes, and concatenate a prefix to the reduced identifier based on the identified purpose. In some embodiments, the plurality of purposes may correspond to a plurality of respective columns of data within a database table. In some embodiments, the processor 620 may determine the reduced identifier based on an increment of a previously assigned reduced identifier. As a non-limiting example, if a previous reduced identifier is "002000104," the next reduced identifier that is assigned may be "002000105". Each reduced identifier in sequence may be incremented by a certain numerical amount (e.g., 1, 2, etc.)

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a storage configured to store database data from a database; and
a processor configured to
receive a database entry that includes a global unique identifier (GUID) which uniquely and globally identifies the database entry within the database,
identify a transformation function associated with the database entry, where the transformation function includes an offset byte value that comprises a first subset of bytes that have equal byte values as a corresponding first subset of bytes of the GUID and a last subset of bytes that each have a byte value of zero,
transform the GUID into a reduced identifier via subtraction of the offset byte value in the transformation function from the GUID, wherein the reduced identifier comprises a reduced size with respect to a size of the GUID, and uniquely and globally identifies the database entry within the database, and
remove the GUID from the database and the database entry, and replace the removed GUID within the database entry with the reduced identifier.

2. The computing system of claim 1, wherein the processor is further configured to normalize the GUID prior to the transforming to generate a normalized GUID with respect to previous GUIDs among a sequence of GUIDs created by the database.

3. The computing system of claim 1, wherein the offset byte value comprises a same number of bytes as the GUID.

4. The computing system of claim 1, wherein the transformation function comprises a bijective transformation function in which an inverse thereof is configured to regenerate the GUID from the reduced identifier.

5. The computing system of claim 1, wherein the GUID of the database entry is created based on a timestamp at which the database entry is created by the database.

6. The computing system of claim 1, wherein the processor is configured to identify a purpose associated with the database entry from among a plurality of purposes, and concatenate a prefix to the reduced identifier based on the identified purpose.

7. The computing system of claim 1, wherein the processor is configured to truncate digits of the reduced identifier and replace the removed GUID with the truncated reduced identifier.

8. The computing system of claim 1, wherein the processor is further configured to determine the reduced identifier based on an increment of a previously assigned reduced identifier.

9. The computing system of claim 1, wherein the offset byte value further comprises an intermediary subset of bytes between the first and last subsets of bytes, and the intermediary subset of bytes comprise different byte values than corresponding byte values of the GUID and the different byte values are not zero.

10. A method comprising:
receiving a database entry that includes a global unique identifier (GUID) which uniquely and globally identifies the database entry within a database;
identifying a transformation function associated with the database entry, where the transformation function includes an offset byte value that comprises a first subset of bytes that have equal byte values as a corresponding first subset of bytes of the GUID and a last subset of bytes that each have a byte value of zero;
transforming the GUID into a reduced identifier via subtraction of the offset byte value in the transformation function from the GUID, wherein the reduced identifier comprises a reduced size with respect to a size of the GUID, and uniquely and globally identifies the database entry within the database; and
removing the GUID from the database and the database entry, and replacing the removed GUID within the database entry with the reduced identifier.

11. The method of claim 10, further comprising normalizing the GUID prior to the transforming to generate a normalized GUID with respect to previous GUIDs among a sequence of GUIDs created by the database.

12. The method of claim 10, wherein the offset byte value comprises a same number of bytes as the GUID.

13. The method of claim 10, wherein the transformation function comprises a bijective transformation function in which an inverse thereof is configured to regenerate the GUID from the reduced identifier.

14. The method of claim 10, wherein the GUID of the database entry is created based on a timestamp at which the database entry is created by the database.

15. The method of claim 10, wherein the identifying the transformation function comprises identifying a purpose associated with the database entry from among a plurality of purposes, and concatenating a prefix to the reduced identifier based on the identified purpose.

16. The method of claim 10, wherein the removing comprises truncating digits of the reduced identifier and replacing the removed GUID with the truncated reduced identifier.

17. The method of claim 10, further comprising determining the reduced identifier based on an increment of a previously assigned reduced identifier.

18. A non-transitory computer readable medium comprising program instructions which when executed are configured to perform a method comprising:
receiving a database entry that includes a global unique identifier (GUID) which uniquely and globally identifies the database entry within a database;
identifying a transformation function associated with the database entry, where the transformation function includes an offset byte value that comprises a first subset of bytes that have equal byte values as a corresponding first subset of bytes of the GUID and a last subset of bytes that each have a byte value of zero;
transforming the GUID into a reduced identifier via subtraction of the offset byte value in the transformation function from the GUID, wherein the reduced identifier comprises a reduced size with respect to a size of the GUID, and uniquely and globally identifies the database entry within the database; and
removing the GUID from the database and the database entry, and replacing the removed GUID within the database entry with the reduced identifier.

19. The non-transitory computer readable medium of claim 18, wherein the method further comprises normalizing the GUID prior to the transforming to generate a normalized GUID with respect to previous GUIDs among a sequence of GUIDs created by the database.

20. The non-transitory computer readable medium of claim 18, wherein the offset byte value comprises a same number of bytes as the GUID.

21. The non-transitory computer readable medium of claim 18, wherein the transformation function comprises a bijective transformation function in which an inverse thereof is configured to regenerate the GUID from the reduced identifier.

* * * * *